United States Patent [19]

Gabriele

[11] 4,449,872
[45] May 22, 1984

[54] BROACHING MACHINE

[75] Inventor: Leonard A. Gabriele, Warren, Mich.

[73] Assignee: Lear Siegler, Inc., Santa Monica, Calif.

[21] Appl. No.: 269,311

[22] Filed: Jun. 1, 1981

[51] Int. Cl.³ .................. B23D 37/10; B23D 41/06
[52] U.S. Cl. ............................ 409/252; 198/424;
    221/68; 221/234; 409/256; 409/257; 409/266;
    409/268; 409/271
[58] Field of Search ............. 409/250, 251, 256, 257,
    409/268, 270, 271, 277, 252, 266; 198/747, 560,
    406, 424, 427, 381; 414/224; 221/68, 175, 263,
    252, 234, 233; 10/165

[56] References Cited

U.S. PATENT DOCUMENTS

| 1,219,803 | 3/1917 | Brightman | 408/70 |
|---|---|---|---|
| 1,426,738 | 8/1922 | Hook | 409/252 |
| 3,831,736 | 8/1974 | Barnes | 198/690 |
| 3,897,715 | 8/1975 | Holstein et al. | 409/250 |
| 3,977,160 | 8/1976 | Klug et al. | 221/68 |
| 4,104,984 | 8/1978 | Kellermann et al. | 198/424 |

FOREIGN PATENT DOCUMENTS 829357  5/1981  U.S.S.R. .......................... 409/257

Primary Examiner—Frank T. Yost
Assistant Examiner—Hien H. Phan
Attorney, Agent, or Firm—Barnes, Kisselle, Raisch, Choate, Whittemore & Hulbert

[57] ABSTRACT

A fully automatic machine tool for simultaneously broaching parallel slots on a plurality of workpieces mounted on a rotatable table in which the table is indexed between a plurality of broaching operations to revolve the workpieces and hence to effect rotation of the workpieces about their own axes with respect to the path of broaching tools.

29 Claims, 12 Drawing Figures

BROACHING MACHINE

BRIEF SUMMARY OF THE INVENTION

The present invention relates to a machine tool for performing an operation on a plurality of like workpieces simultaneously. The machine tool has automatic loading and unloading equipment incorporated therein.

The embodiment of the invention chosen for illustration herein is a broaching machine, and more particularly a vertical broaching machine in which the broaching operation is of the type known in the art as an internal pull-down broaching operation.

As illustrated the workpiece to be broached is an annular body, and the broaching operation is to broach the interior cylindrical surface thereof. As the description proceeds, it will be apparent that the operation could be other than broaching, as for example grinding, turning, or the like. Moreover, where the operation is broaching, the surface to be broached may be internal or external, and the surface may be non-circular, as for example, a toothed surface.

BACKGROUND OF THE INVENTION

Machine tools of all sorts are today equipped with devices for making the operation fully automatic, and in this connection automatic loading and unloading equipment is provided as an attachment or tooling, or may be incorporated in the machine tool.

It is also known to provide machine tools capable of performing like operations on a plurality of workpieces, and more specifically broaching machines for simultaneously broaching a plurality of like parts are known, and are equipped with automatic loaders and unloaders.

SUMMARY OF THE INVENTION

In accordance with the present invention, a machine tool, such for example as the six-station pull-down broaching machine disclosed in detail herein, is provided with a plurality of work stations equipped to perform a like number of simultaneous machine operations on a like number of identical workpieces. The work stations are disposed in a regular array, as for example uniformly spaced in a straight line. The machine tool is fully automatic in operation, and a multiplicity of workpieces are advanced in an inchute. Conveniently the workpieces may have an external cylindrical surface so that they may roll down an inclined inchute until the leading workpiece is engaged with a stop, and the following workpieces form a solid array in the chute.

The spacing between the work stations will normally be much greater than the spacing of adjacent workpieces, so that non-adjacent workpieces, as for example, every fifth or sixth workpiece is approximately in line with a work station. Means are accordingly provided at the inchute to displace a non-adjacent plurality of workpieces from the solid array in the inclined inchute, and the gaps in the array are filled as the remaining workpieces roll down in the chute.

In the machine tool illustrated herein, the workpieces are annular and are to have the central hole broached. It is therefore necessary to turn the individual workpieces 90° to properly present them to a series of vertical, pull-down broaches.

Furthermore, the machine tool will normally provide the plurality of work stations at an invariable spacing, and it will usually occur that the workpieces, as displaced from the solid array in the inchute, will not register precisely with the corresponding work stations. Means are provided for receiving the workpieces at the spacing dictated by their dimensions, and advancing them simultaneously into sufficiently precise registration with the broaches to provide for initial insertion of the broaches through the workpieces into engagement with an assembly of broach pullers.

The machine tool is designed for maximum production and unloading or ejection means is provided which is effective to simultaneously eject all finished workpieces and to again turn them through 90° so that they may roll down an inclined outchute. This comprises individual camming means associated with each workpiece which are all simultaneously actuated to displace the finished workpieces into a turnover device which deposits them simultaneously in the inclined outchute.

The camming means comprises a pair of blocks in alignment with and at opposite sides of each of the workpieces. At least one, and preferably both of the blocks has a camming surface thereon. Corresponding blocks are fixed, and the remaining blocks interconnected for simultaneous movement which displaces the finished workpieces from working position into engagement with the adjacent stationary block and then cams them into the turn-over device which deposits them in the inclined outchute. Accordingly, ejection of all finished workpieces requires only a short travel of the means which interconnects all of the movable blocks.

DETAILED DESCRIPTION

Figure 1:
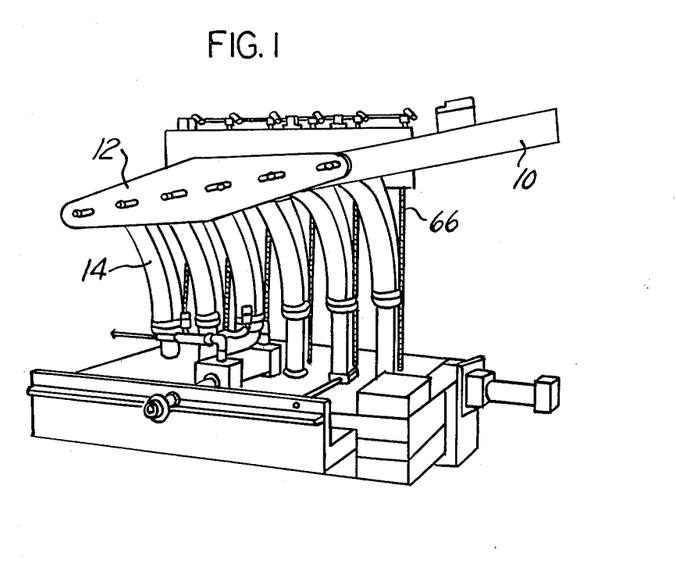
FIG. 1 is a fragmentary perspective view of the machine tool.

FIG. 1 is a fragmentary perspective view of the broaching machine and in this view the inclined inchute is indicated at 10 and is associated with a corresponding pusher bar 12 provided with an assembly of adjustable push rods which move non-consecutive workpieces from the inchute through inclined guide tubes 14 and deposit them on a horizontal support plate along which they are advanced by a multiplicity of pushers into position registering with a like plurality of vertical pull-down broaches.

Details of this mechanism are seen in the remaining figures.

The present invention relates to a machine tool and in many of its aspects it may relate to different types of machine tools. However the invention is illustrated and described in connection with a machine for broaching cylindrical holes in annular workpieces to a predetermined cylindrical configuration.

The inchute 10 which comprises a base plate 16 and side plates 18 is inclined to permit a multiplicity of workpieces W to be received in the chute and to roll downwardly so that the foremost workpiece engages a stop plate 20, the remaining workpieces forming with the foremost workpiece a solid array.

It will be understood that it is important to provide the broaching machine with a plurality of stations, each of which has associated therewith a vertical pull-down broach adapted to be drawn through the opening in the aforesaid workpiece W. After each broach has been drawn completely through the workpiece, means are provided for expelling the completed workpieces from the machine and thereafter broach retrievers forming a part of the broaching machine move downwardly and engage the upper ends of the broaches and draw them to the initial position, leaving clear a space into which the following workpieces are advanced for the next broaching operation. The succeeding broaching operation of course involves downward movement of the gang of broaches carried by a retriever support bar, to insert the lower ends of the broaches through the workpieces and into engagement with connections to a puller bar adapted to be moved downwardly by suitable means, such for example as a hydraulic piston and cylinder device.

The apparatus has been designed for the specific purpose of increasing the production rate of the machine and accordingly automatic means are provided which ensures rapid infeed and outfeed of the workpieces with a minimum of time consumed by all functions of the machine except for the actual broaching operation.

The workpieces may be supplied to the inclined inchute 10 by any suitable mechanism and the supply of workpieces is monitored by a switch 22 which has a flexible actuator 24 adapted to being engaged by successive workpieces as they are supplied to the machine. This switch, details of which form no part of the present invention, incorporates a brief time delay mechanism so that operation of the switch by passage of a succession of workpieces passing beneath the actuator 24 will not terminate operation of the machine.

Figure 4:
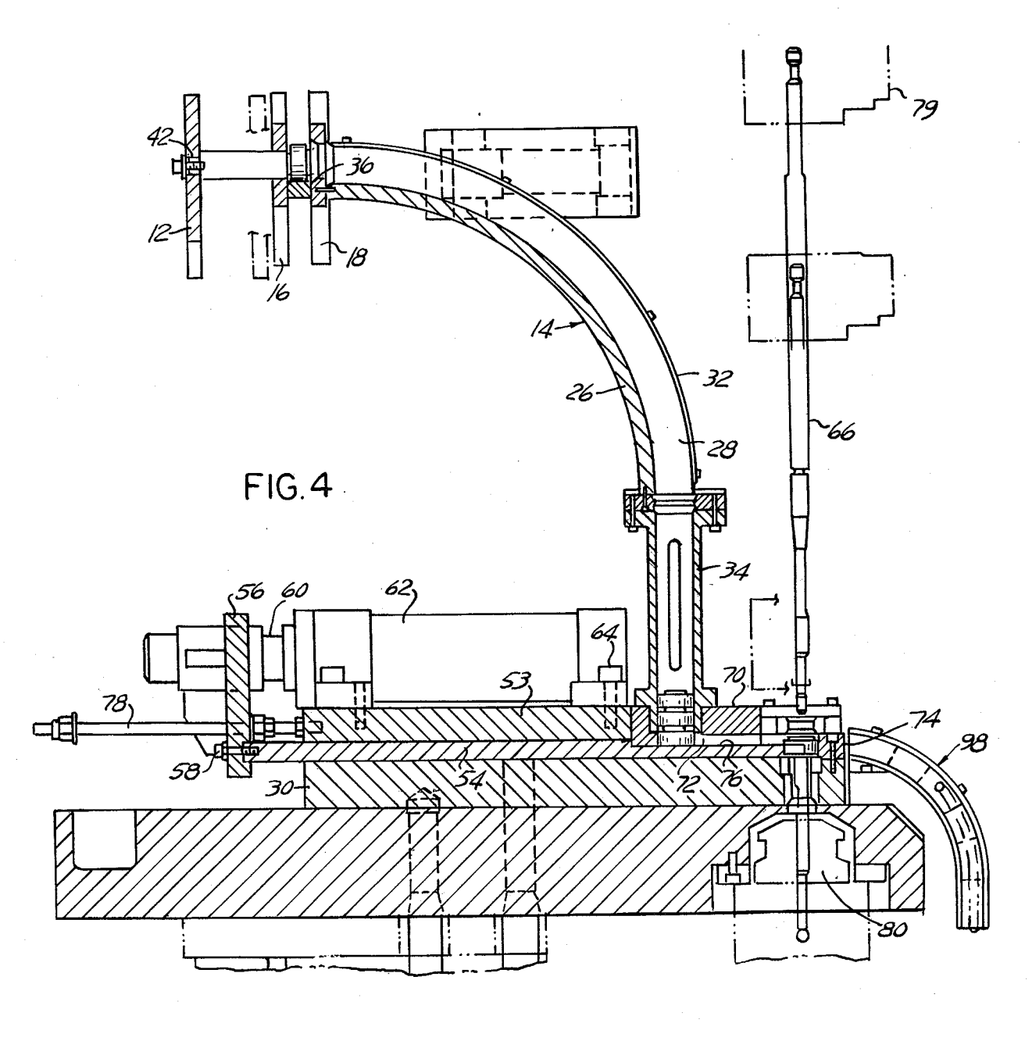
FIG. 4 is a vertical section on the line 4—4, FIG. 3.

In order that the present machine shall be capable of the operation on a variety of differently dimensioned workpieces, it is designed such that non-consecutive workpieces are projected from the inclined inchute 10 into curved turnover tubes 14 best seen in FIG. 4. For example, if the individual broach stations on the machine have a spacing 4½ inches and if the individual workpieces have an outside diameter of 1½ inches, it will be appreciated that every third workpiece in the solid array of workpieces in the inchute 10 is approximately aligned with an individual broach station. However in order to accommodate workpieces which in a solid array have spacings so that not all of the workpieces are aligned with an individual broaching station, means are provided for advancing the workpieces so that each is in substantially exact alignment with an associated broaching station.

The individual turnover tubes 14 include a 90° arcuately curved portion and are formed to have a bottom wall 26 and side walls 28 forming a U-shaped tube adapted to receive a workpiece in suitably interfitting relationship so that the workpiece as it is moved through the tube, is turned over so that its axis extends vertically as it is deposited on a base plate 30. The open sides of the support tubes are partially closed by a bent flexible plate 32.

Since the support plate 30 is horizontal and the individual workpieces as they are delivered from the inclined inchute are at different heights, the lower end of the turnover tubes 14 are provided with guide tubes 34 of different heights so that all curved turnover tubes 14 for a particular workpiece may be identical.

Figure 2:
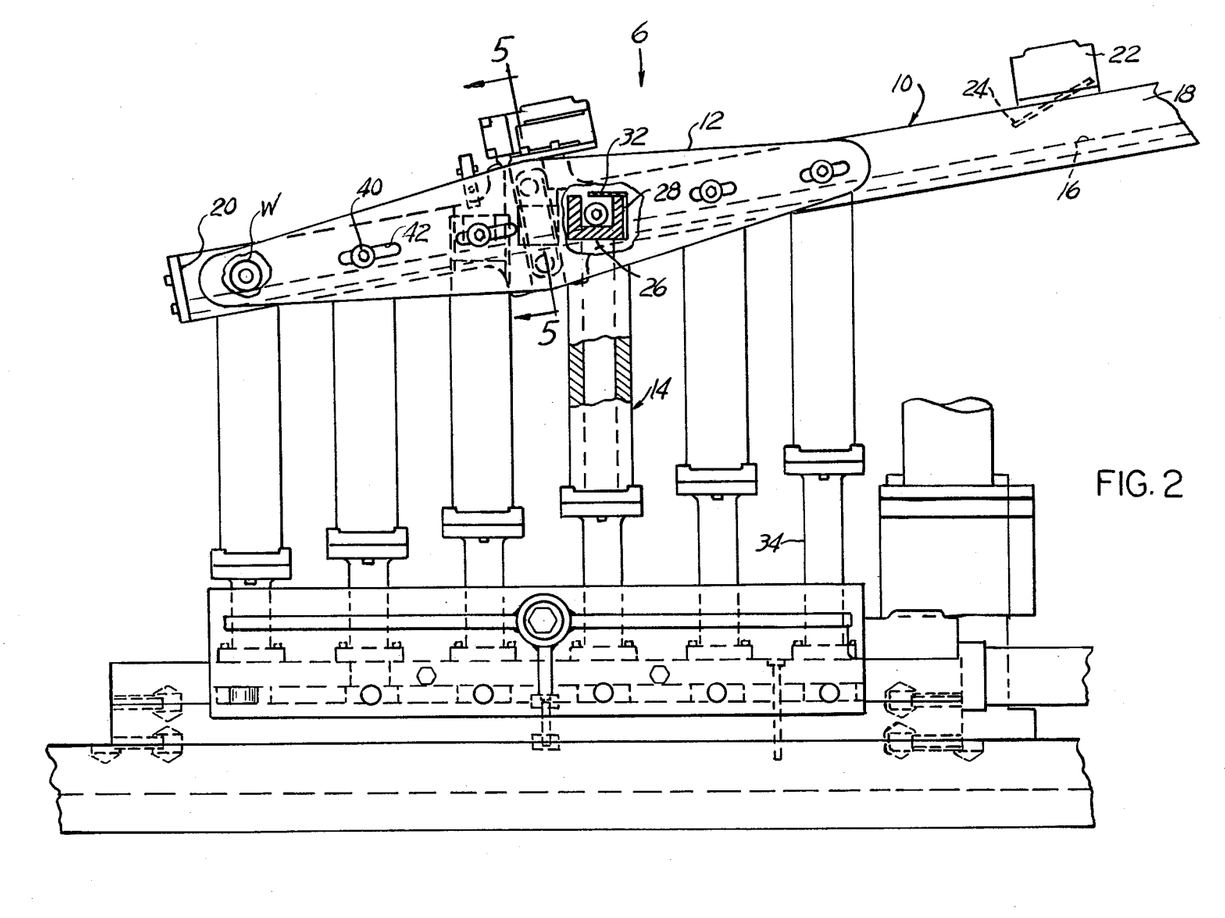
FIG. 2 is a front elevational view of the machine tool.

Means are provided for projecting non-consecutive workpieces through openings 36 provided in the side wall 18 of the chute and for this purpose a pusher bar 12 is provided having a plurality of pusher elements 40 adjustably secured thereto in elongated slots 42 as best seen in FIGS. 2 and 4.

Figure 5:
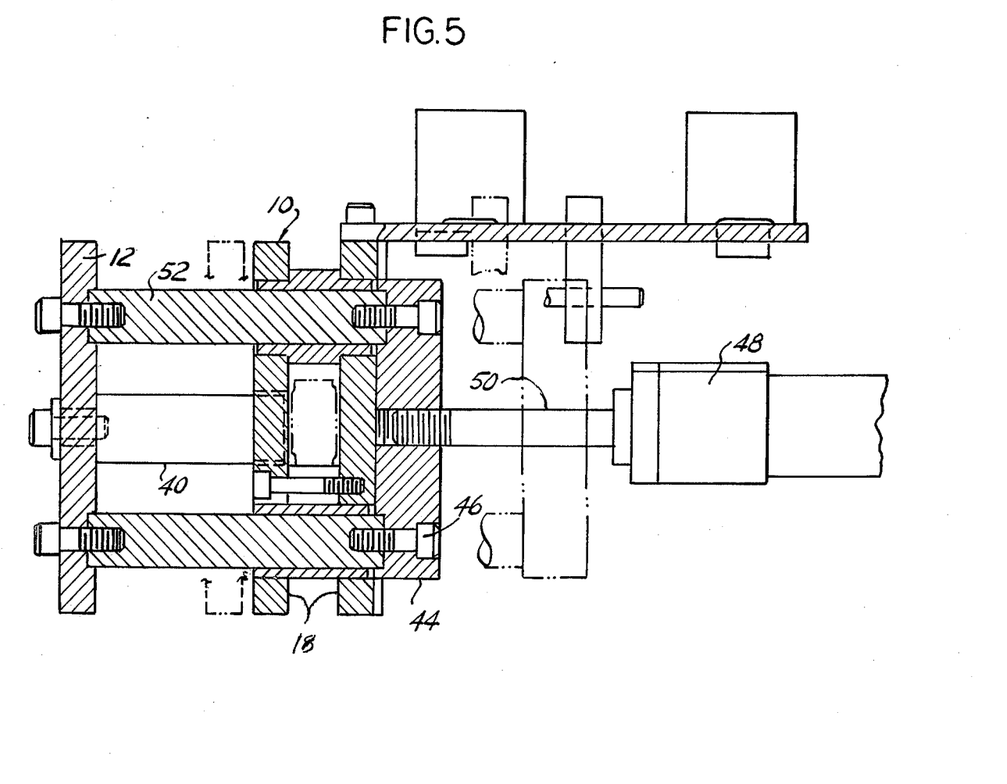
FIG. 5 is an enlarged sectional view on the line 5—5, FIG. 2.
Figure 6:
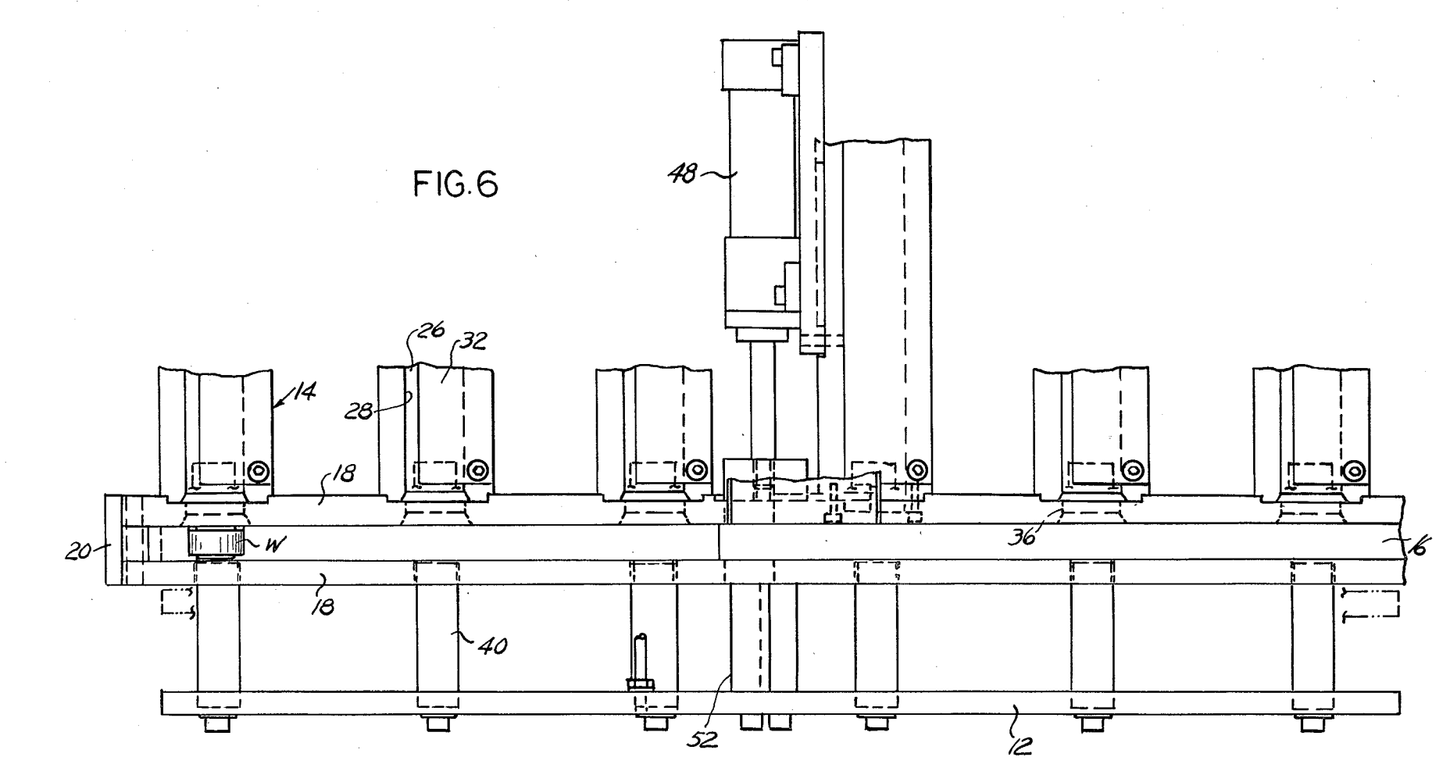
FIG. 6 is a view in the direction of arrow 6, FIG. 2.

Referring now to FIG. 5 the pusher bar 12 is connected to an actuator plate 44 as by screws 46 and is adapted to be actuated by a piston and cylinder device 48 which in turn is connected to the actuator plate 44 by the piston 50. Guide bars 52 extend through openings in the inchute 10 so that actuation of the piston and cylinder device 48 advances the pushers 40 so as to project the individual workpieces sufficiently into the curved upper end of the turnover tubes 14 to cause them to move by gravity the remaining distance and thereby deposited on the base plate 30 as best seen in FIG. 4. The corresponding position of plate 44 is shown in dot and dash lines.

Figure 3:
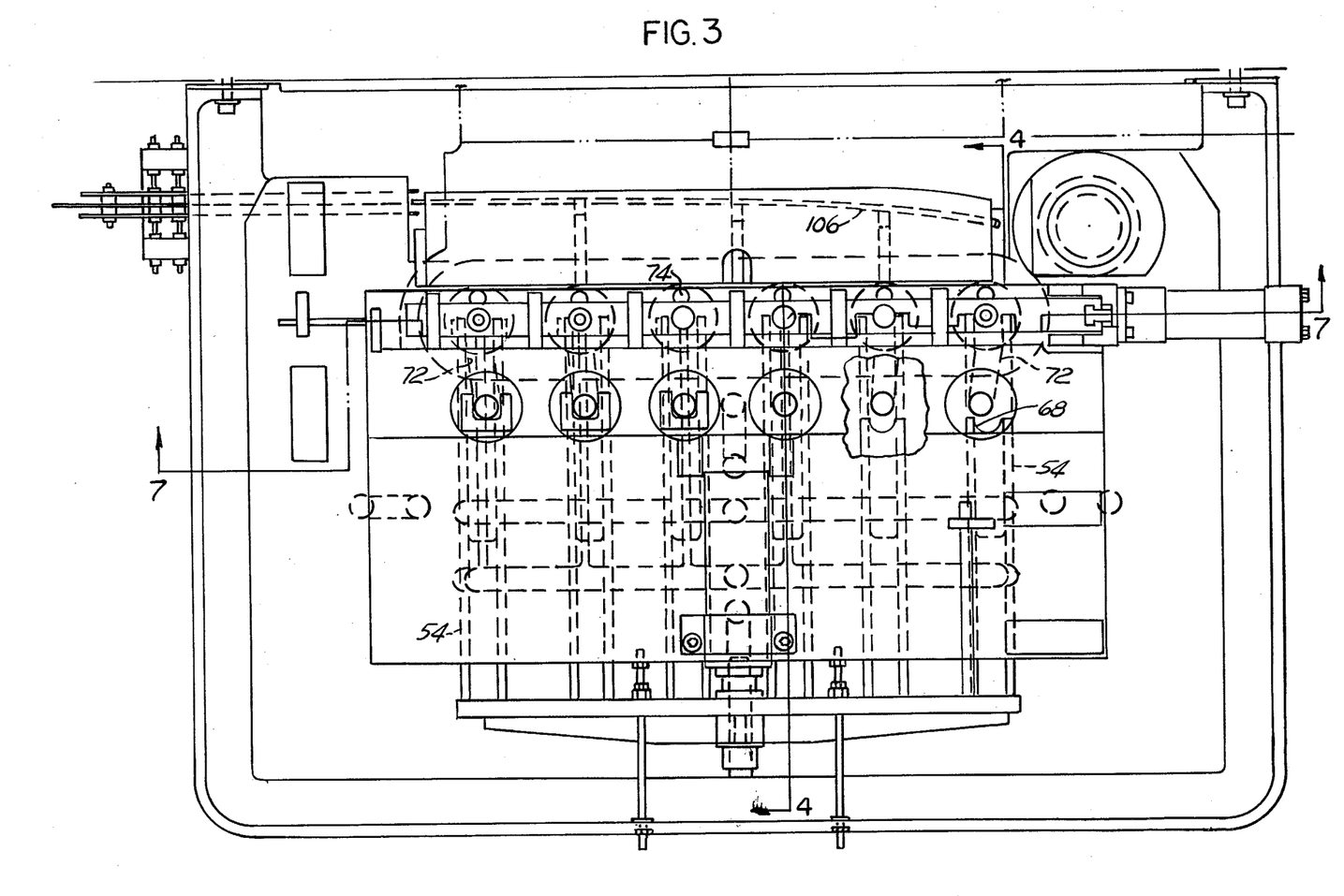
FIG. 3 is a plan view of the machine.

Referring now more particularly to FIGS. 3 and 4 the workpieces W are received in the individual straight vertical tubes or magazines 34 in side abutting relationship, the lowermost of which is slidably supported on the base plate 30. Spaced above the upper surface of the base plate 30 is a keeper plate 53. A plurality of elongated feed bars 54 are provided slidable in rectilinear guideways provided between the base plate 30 and the keeper plate 53. Feed bars 54 are individually secured to feed bar brackets 56 as by screws 58 and the bracket is connected to a piston 60 extending from a feed cylinder 62 rigidly secured as by screws 64 to the keeper plate 53.

The individual feed bars 54 are spaced in conformity with the spacing of the turnover tubes 14 and magazines 34, without reference to the precise spacing between the individual broach stations. This permits adaption of the apparatus to workpieces of different dimensions while maintaining the same spacing between adjacent work stations, as determined primarily by the broaches, broach pullers, retrievers, etc.

In order to provide precise alignment of the individual workpieces with the corresponding broaches, the latter being shown at 66 in FIG. 4, the individual feed bars, as best illustrated in FIG. 3 are provided at the front ends thereof with semi-circular recesses 68. These recesses are formed individually in each feed bar so as to be substantially exactly aligned with the corresponding broach station. As a result of this the recesses 68 in the different feed bars are not symmetrically provided at the forward ends of the feed bars. For example, the recess 68 in the second bar from the right in FIG. 3 is adjacent the right side thereof, while recess 68 at the end of right hand bar is centered with respect thereto. In order to provide for proper registration between the workpieces and the broaches, a cam plate 70 is provided having at its lower side individual trackways 72 appropriately and usually differently inclined as appears in FIG. 3 to guide the individual workpiece from its position below the magazine 34 into alignment with the corresponding broach 66. As will be apparent from FIG. 3 the feed bar usually engages the workpiece while the workpiece is not in alignment with the semi-circular recess 68. As the feed bars advance the workpieces move forwardly towards the broaches along the paths determined by the corresponding inclined grooves 72 during this advance, and accordingly are brought into alignment with the associated semi-circular recesses 68. Thereafter the feed bar moves the workpiece forwardly into a located position determined by engagement with a locater pin 74. At this time the workpiece as best illustrated in FIG. 4 is positioned as precisely as required beneath the bottom end of the broach 66. Normally, as is conventional in broaching practice, the workpiece is not positively held but is permitted to be moved by its engagement with the broach into precisely centered relationship therewith.

To accomplish this result of course the feed bars are retracted, leaving the workpieces slidable on the support 30 except as such movement is limited by its associated pin.

It will be observed that as a particular workpiece is advanced to the right to the position beneath its corresponding broach, as seen in FIG. 4, the superimposed workpiece in the magazine moves downwardly into engagement with the upper surface 76 of the feed bar 54. After the individual workpiece has been suitably engaged by the associated broach, the feed bar 54 is retracted and as soon as its leading end moves to the left of the stack of workpieces, the bottom workpiece drops downwardly onto the top surface of the base plate 30, ready to be advanced by the next actuation of the feed bar.

The stroke of the feed bars is determined by a threaded adjustable stop 78 carried by the keeper plate 53 on which the cylinder 62 is mounted. As seen in FIG. 4 the feed bar 54 is shown in its advanced position cooperating with the locater button 74 to locate the workpiece directly beneath the lower end of the broach 66. The adjustable stop 78 is shown in the position it occupies when the feed bars are retracted.

The broaching machine includes ganged broach retriever means indicated generally at 79 and similarly ganged broach pullers 80 adapted to engage and interlock with tangs at the lower end of the individual broaches 66. Separate piston and cylinder devices are connected to the ganged broach pullers and retrievers.

While the machine illustrated herein is designed for the broaching of small cylindrical holes in annular workpieces, it is desirable to cause the individual broaches to rotate as they are pulled downwardly through the workpieces. The means for accomplishing this comprises a vertical lead bar device indicated generally at 82 which is adapted to rotate all of the individual broach pullers through the medium of suitable gearing interconnecting the pullers. This is for the purpose of eliminating tooth marks parallel to the axis of the workpiece.

An important feature of the present invention is the special means designed for ejecting finished workpieces simultaneously from the machine in the shortest possible interval. It will be recalled that the individual workpieces are initially pushed prior to the broaching operation against locater pins 74. This precludes simple ejection of the finished workpiece by movement along the line traversed by the workpiece as it moves from the magazine 34 into alignment with the broach 66.

Figure 3A:
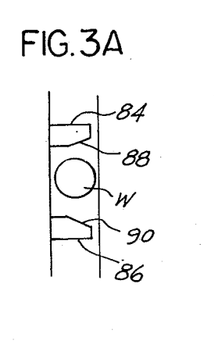
FIG. 3A is a detail view of camming ejection blocks.
Figure 7:
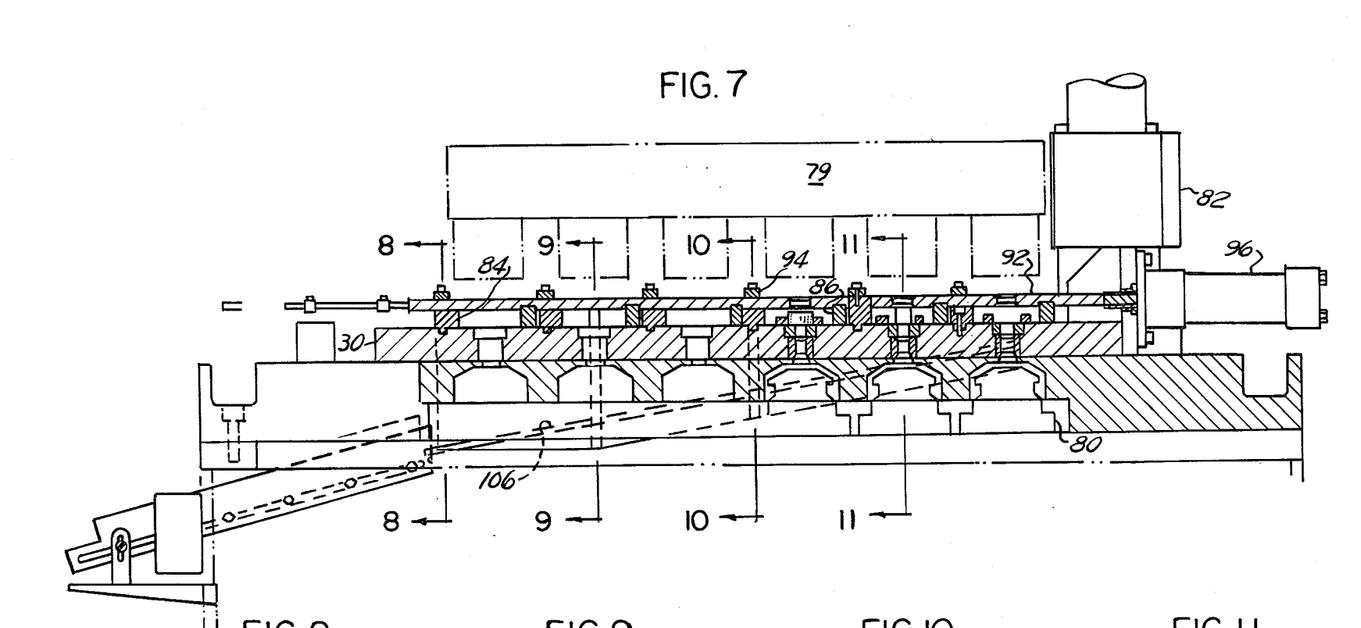
FIG. 7 is a fragmentary section on the line 7—7, FIG. 3.
Figure 8:
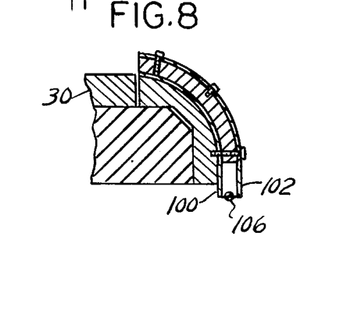
FIGS. 8-11 are sections on the lines 8—8, 9—9, 10—10 and 11—11, FIG. 7.

Referring now to FIGS. 3, 4 and 7, each work station has associated therewith ejecting means comprising a stationary unloading block or cam 84 and a movable unloading block or cam 86. Preferably both blocks 84 and 86 have inclined camming surfaces so that as the blocks approach each other the workpiece is engaged between the approaching blocks and is ejected laterally by the cam surface or surfaces thereon. It will of course be apparent that either or both of the blocks 84 or 86 may have the inclined cam surfaces which are indicated at 88 and 90 in FIG. 3A. Stationary blocks 84 are set onto recesses in the base plate 30 and the movable blocks 86 are set into recesses in a tie bar 92 retained in longitudinal slidable relation below transverse straps 94. A piston and cylinder device 96 is connected to the tie bar 92. It will be recalled that the feed bars 54 are retracted to the positions indicated in FIG. 3 after each workpiece has been suitably engaged with the associated broach. When the broaching operation is complete the upper end of the broach is moved downwardly below the workpiece which is then ready for ejection from the machine. However at this time it is still in a position engaging the locater 74. Accordingly when the cylinder 96 is actuated to move the tie bar 92 to the left as seen in FIG. 7 the movable ejection blocks 86 all engage the right hand side of the workpieces as viewed in FIG. 7 and shifts them laterally out of alignment with the locater pin 74 and into engagement with the adjacent surfaces of the stationary ejector block 84. Further motion of the tie bar at this time abruptly cams all of the workpieces laterally of the aligned row which they occupy into a curved turnover discharge chute 98. This of course requires only sufficient movement of the tie bar 92 to close the blocks 84 and 86 onto the finished workpiece and accordingly it may be accomplished with limited travel in a very brief interval.

The discharge chute 98 comprises a 90° arcuate portion defined between suitably curved sheets 100 and 102 which are conformed to spacers 104 as best seen in FIGS. 4 and 8–11. The discharge chute 98 as defined between the curved sheets 100 and 102 is open at both its upper and lower ends, except at its lower end it is provided with an inclined rail or rod 106. The inclination of the rail or rod 106 is indicated by the successive sections of FIGS. 8–11 and it will be understood that the finished workpieces simply roll down the rails 106 and free drainage is permitted by virtue of the open end of the discharge chute.

Figure 9:
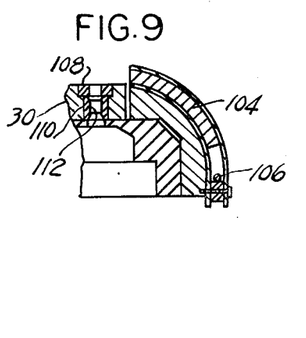
Figure 10:
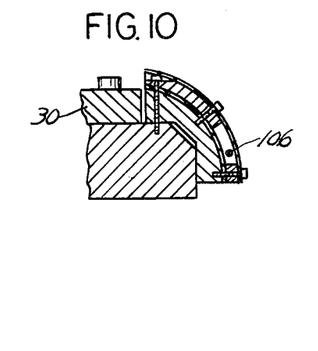
Figure 11:
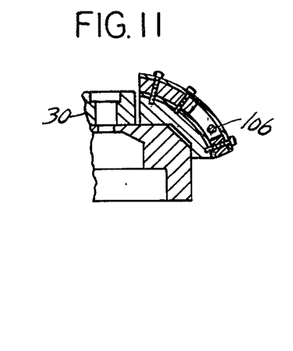

As best seen in FIG. 9 the base plate 30 is provided with an annular wear plate 108 against which the individual workpieces rest during the broaching operation and below the wear plate 108 are bushings 110 with the cylindrical openings 112 to receive the lower ends of the broaches and having the end portions of the openings 112 suitable inclined to guide the ends of the broaches as they enter the bushings.

Reference was made to a switch 22 including an actuator 24 to monitor entrance of the workpieces into the inclined inchute.

It will be understood that the machine is provided with suitable switch means responsive to completion of designated operations which initiate the next successive operation. Since these switches are in general of conventional construction and since the appropriate placement of the switches to monitor the particular operations will be obvious to those familiar with the art, no effort has been made to describe these switches.

I claim:

1. An automatic precision machine tool for simultaneously performing a precision machining operation on a plurality of flat workpieces of circular cross-section, comprising a work station having a flat horizontal support surface on which flat sided workpieces are supported with flat sides thereof on said support surface, metal-cutting means at said work station comprising a plurality of vertically movable broaches arranged in lateral alignment at uniform spacing, and individual fixed locating means on said surface engageable with the workpieces in broaching position, loading means comprising an elongated inlet guide along which a solid array of workpieces is advanced with the flat sides thereof in vertical planes and edges in contact, a stop engaging the leading workpieces in said inlet guide, said workpieces being dimension such that nonconsecutive workpieces are in approximate alignment with said individual locating means and corresponding broaches, turnover means including an arcuate turn-over means extending through an arc of 90° having an upper horizontally presented inlet and a lower vertically arranged outlet, pusher means for pushing non-consecutive workpieces spaced apart distances approximating the spacing of said broaches and individual locating means from said inlet guide into the inlet of said turn-over means to deposit the plurality of workpieces on said support surface spaced from said individual fixed locating means, means for advancing the workpieces over said surface into engagement with said locating means means for actuating said broaches, and unloading means comprising an elongated outlet guide, and means operable after actuation of said broaches for displacing the finished workpieces from said work station to said outlet guide.

2. Apparatus as defined in claim 1, in which said workpieces have cylindrical peripheries, and in which said inlet guide comprises an inclined chute along which the workpieces roll by gravity.

3. Apparatus as defined in claim 1, in which said workpieces have cylindrical peripheries, and in which the outlet guide of said unloading means comprises an inclined outlet chute along which finished workpieces roll by gravity, said unloading means comprising means for turning the workpieces through 90° and transferring them to said outlet chute.

4. Apparatus as defined in claim 1, in which said workpieces have cylindircal peripheries, and in which said inlet and outlet guides comprise inclined chutes along which the workpieces roll by gravity, said loading and unloading means comprising means for turning the workpieces through 90° during transfer from said inlet chute to said work station and transfer from said work station to said outlet chute.

5. Apparatus as defined in claim 1, said loading means further comprising individual horizontal guide means for each workpiece extending from the position in which the workpiece exits its inlet turn-over means to its work position as determined by the location of the corresponding broach, and transfer means for advancing said plurality of workpieces along their guide means to work position.

6. Apparatus as defined in claim 1, said work station comprising a broach actuator support having a plurality of broaches connected thereto, means for moving said drive support vertically to broach a like plurality of workpieces simultaneously, and a broach retriever support engageable with the broaches to withdraw said broaches from the broached holes in the workpieces.

7. Apparatus as defined in claim 6, in which said broach actuator support includes means engageable with the bottom ends of broaches inserted downwardly through holes in the workpieces, and said retriever support includes means engageable with the upper ends of broaches above the workpieces for raising the broaches out of the broached holes.

8. Apparatus as defined in claim 1, in which a plurality of finished workpieces are slidably supported in substantially spaced apart relation in alignment respectively with said vertically movable broaches, and at the sides of said individual locating means adjacent the outlet of said turn-over means, said workpieces and broaches being spaced substantially horizontally in a straight line, said unloading means comprising a pair of relatively movable abutments at opposite sides of each workpiece and coincident with said straight line, at least one of each pair of abutments having an inclined camming surface engageable with the side of its associated workpiece, and means for moving corresponding ones of each pair of abutments toward the other abutment to cam all of the workpieces simultaneously laterally of said line toward said outlet guide.

9. Apparatus as defined in claim 8, said unloading means comprising outlet turn-over guide means curved 90° to receive finisher workpieces as cammed from the horizontal support surface of said work station and turn them through 90°, said outlet guide comprising an inclined chute positioned to receive finished workpieces from said outlet turn-over guide means.

10. Apparatus as defined in claim 8, in which said movable cams first shift finished workpieces out of interfering location with said individual locating means into engagement with said other cams and then cam them toward said outlet guide.

11. High production broaching apparatus comprising:
a plurality of vertical elongated broaches positioned in lateral alignment,
workpiece locating means in longitudinal alignment with each of said broaches,
means for effecting relative longitudinal movement between said broaches and the workpieces at said locating means,
a loader comprising an elongated guide along which a multiplicity of workpieces are advanced in a solid array, transfer means for advancing a like plurality of non-consecutive workpieces from said solid array into individual alignment with said broaches as determined by said locating means, said transfer means comprising individual relatively inclined guides for the workpieces to provide for a lateral spacing between the adjacent workpieces at the locating means which differs from the lateral spacing of the same workpieces while in said solid array,
and unloading means comprising means for ejecting all finished workpieces simultaneously upon completion of the broaching operation.

12. Apparatus as defined in claim 11, in which said apparatus is designed for annular workpieces, and said apparatus comprising an inclined feed chute in which the workpieces advance in a solid array with their axes horizontal.

13. Apparatus as defined in claim 12, in which the transfer means comprises means for turning the workpieces as they advance from said solid array to dispose their axes vertical.

14. Apparatus as defined in claim 13, said turning means comprising tubular guides having curved intermediate portions.

15. Automatic loading equipment for a multi-station broaching machine having a plurality of elongated, laterally spaced and aligned vertical broaches, said equipment comprising means for advancing a multiplicity of workpieces in a solid array extending generally parallel to the alignment of broaches, transfer means for advancing a like plurality of non-consecutive workpieces from said solid array into individual alignment with the broaches, said transfer means comprising relatively inclined guides to provide for a spacing of the workpieces when aligned with the broaches which is different from the same workpieces when in said solid array.

16. Equipment as defined in claim 15, in which said transfer means comprises means for advancing nonconsecutive workpieces from said solid array.

17. Equipment as defined in claim 15, in which the workpieces are annular and in which the means for advancing the workpieces in a solid array comprises an inclined feed chute in which the workpieces are received with their axes horizontal, said transfer means including workpiece turning means to turn the workpieces to position their axes vertical.

18. Equipment as defined in claim 17, in which said transfer means comprises means for advancing non-consecutive workpieces from said solid array.

19. Equipment as defined in claim 17, in which the turning means comprises individual tubes for receiving the workpieces advanced from the solid array, said tubes having horizontal receiving ends, vertically downwardly open discharge ends, and curved intermediate portions to turn the individual workpieces through approximately 90°.

20. Equipment as defined in claim 17, which comprises a support surface onto which said tubes deposit the workpieces, said guides comprise upwardly open channels between said surface and the location of the broaches, and pusher means for pushing all of the workpieces simultaneously along said channels.

21. Equipment as defined in claim 15, in which the workpieces are annular and in which the surfaces to be broached are in openings therethrough.

22. Equipment as defined in claim 21, in which said guides comprise horizontally extending upwardly open channels shaped to receive workpieces with the surfaces to be broached extending vertically.

23. Unloading equipment for a multi-station machine tool comprising a horizontal support surface on which a plurality of finished annular workpieces are received in alignment with their axes vertical and in substantially spaced apart relation, a pair of blocks for each workpiece in alignment with and at opposite sides thereof, means connecting corresponding blocks of each pair for simultaneous movement along the line of workpieces, corresponding blocks of each pair having camming surfaces engageable with the adjacent workpieces, a receiver, and means for advancing all of the interconnected block simultaneously to cam all of the associated workpieces simultaneously into said receiver.

24. Equipment as defined in claim 23 in which a fixed locator is provided at each work station against which individual workpieces are simultaneously advanced in a loading operation, the other blocks of each pair being stationary and spaced from the corresponding finished workpiece, whereby movement of said interconnected blocks first shifts all of the finished workpieces out of alignment with the adjacent locators into engagement with the other blocks and thereafter cams the finished workpieces into said receiver.

25. An automatic loader for a machine tool in which a plurality of workpieces are simultaneously machined at a plurality of work stations aligned in a row with fixed spacings therebetween, said loader comprising means for initially positioning a like plurality of workpieces onto a support in a solid array in a row parallel to the row of aligned work stations but at a spacing substantially greater than the spacing between said work stations, relatively inclined guide trackways for the workpieces extending from the initial positions of the individual workpieces and toward respective work stations, pusher means engageable with non-consecutive ones of the workpieces to move them from said array simultaneously along said trackways toward the corresponding work stations, said pusher means including recesses shaped to receive and support individual workpieces against lateral movement, the recess being spaced apart conformably to the spacing between work stations, and means for advancing said pusher means in a direction perpendicular to the row of work stations to push the workpieces along their corresponding trackways until they are received in corresponding recesses and thereafter to push the workpieces into corresponding work stations.

26. A multiple station broaching machine comprising a row of a plurality of laterally spaced apart work positions, a vertical broach at each of said positions for broaching an opening in an associated workpiece, a flat, horizontal work support surface, means for depositing a like plurality of workpieces in a row parallel to but spaced from the row of work stations and in spaced apart relation on said support surface, guide tracks for guiding the approach of workpieces along non-parallel paths toward their respective work stations, stationary locating abutments at said work positions against which the workpieces abut to locate them in work positions, feed means movable along said surface in a direction transverse to the row of positions, said feed means having work locating recesses facing associated workpieces, each of said recesses being laterally aligned with one of said positions, means for advancing said feed means to push each of said workpieces along its track until it registers with and seats in its associated recess and thereafter engages its associated locating abutment, means for thereafter retracting said feed means to leave the workpieces free for lateral movement on said surface except as such movement is blocked by said abutments, means for moving all of said broaches simultaneously to broach the workpieces and withdraw therefrom, an outfeed receiver adjacent said work positions at the side thereof beyond said abutments to receive broached workpieces, and ejecting means at each position effective to move all of the broached workpieces simultaneously first laterally out of registration with said locating abutments and then into said receiver.

27. Apparatus as defined in claim 26, in which the means for depositing the workpieces on the surface deposits them at spacings differing from the spacings of said positions, guide tracks for guiding the approach of workpieces along non-parallel paths toward the associated positions, and in which at least some of said recesses being out of alignment with the associated workpieces as desposited on said surface, said tracks terminating short of said positions, whereby each feeder pushes its associated workpiece along its track until it registers with and seats in the associated recess and remains located therein after passing the end of its associated track until it engages its associated abutment.

28. A broaching machine as defined in claim 27 in which ejecting means is provided comprising a stationary block adjacent each work station, a movable block at each work station at the opposite side of a workpiece from said stationary block, means for simultaneously moving all of said movable blocks toward the associated stationary blocks to shift the finished workpieces out of registration with the associated locating abutments and into engagement with the associated stationary blocks, at least one of the blocks of the two associated with each workpiece being thus engageable with a finished workpiece having a camming surface shaped to displace the associated workpiece out of the row of work stations and into said outfeed receiver.

29. A broaching machine as defined in claim 28, in which said machine is designed to broach openings in annular workpieces by downward movement of said broaches therethrough while the workpieces are positioned with their axes vertical, said outfeed receiver comprising an arcuately downwardly curved hollow structure effective to turn workpieces through 90° to position their axes horizontal, and an inclined guide in the bottom of said structure along which the finished workpieces roll.

* * * * *